(12) United States Patent
You et al.

(10) Patent No.: US 7,065,368 B2
(45) Date of Patent: Jun. 20, 2006

(54) METHOD FOR CORRECTING NLOS ERROR IN WIRELESS POSITIONING SYSTEM

(75) Inventors: Heung Ryeol You, Daejeon (KR); James J. Caffery, Cincinnati, OH (US); Saipradeep Vekatramen, Cincinnati, OH (US); Saleh Al-Jazzar, Cincinnati, OH (US)

(73) Assignees: KT Corporation (KR); University of Cincinnati, Cincinnati, OH (US)

( * ) Notice: Subject to any disclaimer, the term of this patent is extended or adjusted under 35 U.S.C. 154(b) by 603 days.

(21) Appl. No.: 10/334,499

(22) Filed: Dec. 30, 2002

(65) Prior Publication Data

US 2004/0127228 A1 Jul. 1, 2004

(51) Int. Cl.
*H04Q 7/20* (2006.01)

(52) U.S. Cl. ............... 455/456.1; 455/404.2; 455/456.2; 455/456.3; 455/456.5; 455/456.6; 342/450; 342/453; 701/207

(58) Field of Classification Search ............ 455/404.2, 455/456.1–457, 432.1; 342/375.1, 450, 453; 701/207, 213, 214, 216
See application file for complete search history.

(56) References Cited

U.S. PATENT DOCUMENTS

| | | | | |
|---|---|---|---|---|
| 5,293,642 A | * | 3/1994 | Lo | 455/456.2 |
| 5,974,329 A | * | 10/1999 | Wylie et al. | 455/456.1 |
| 6,163,696 A | * | 12/2000 | Bi et al. | 455/436 |
| 6,456,956 B1 | * | 9/2002 | Xiong | 702/115 |
| 6,907,250 B1 | * | 6/2005 | Ishikawa et al. | 455/450 |
| 6,947,507 B1 | * | 9/2005 | Kelkar et al. | 375/347 |
| 2001/0012781 A1 | * | 8/2001 | Suzuki | 455/456 |

OTHER PUBLICATIONS

Location Using LOS Range Estimation in NLOS Environments, May 6–9, 2002, Vehicular Technology Conference Spring 2002.
A Scattering Model Based Apparoach to NLOS Mitigation in TOA Location Systems, May 6–9, 2002, Vehicular Technology Conference Spring 2002.

* cited by examiner

*Primary Examiner*—Steve M. D'Agosta
(74) *Attorney, Agent, or Firm*—Blakely Sokoloff Taylor & Zafman

(57) ABSTRACT

Provided is a method for correcting a non-line-of-sight (NLOS) error in a wireless positioning system that enhances the location accuracy of a mobile station by correcting location error caused by NLOS propagation when the mobile station is positioned in a wireless mobile communication environment, and a computer-readable recording medium for recording a program that implements the method. The method checks out the location of the MS in the above environment and provides diverse services by correcting the location error caused by NLOS propagation included in a received signal. That is, a user can enjoy a high-quality location service by receiving the location information only within the radius which user wants, such as traveler's information, vehicle tracking, location service, and location-based advertisements, because the location of the user's MS is detected precisely.

17 Claims, 12 Drawing Sheets

FIG. 12B
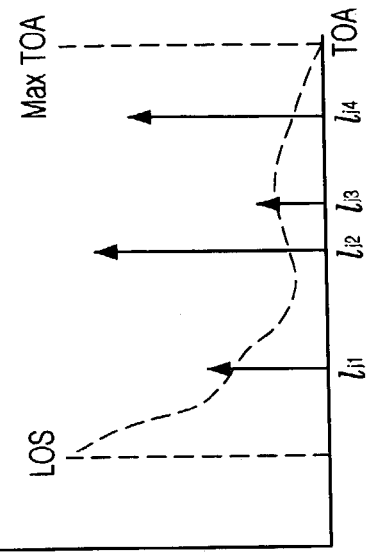
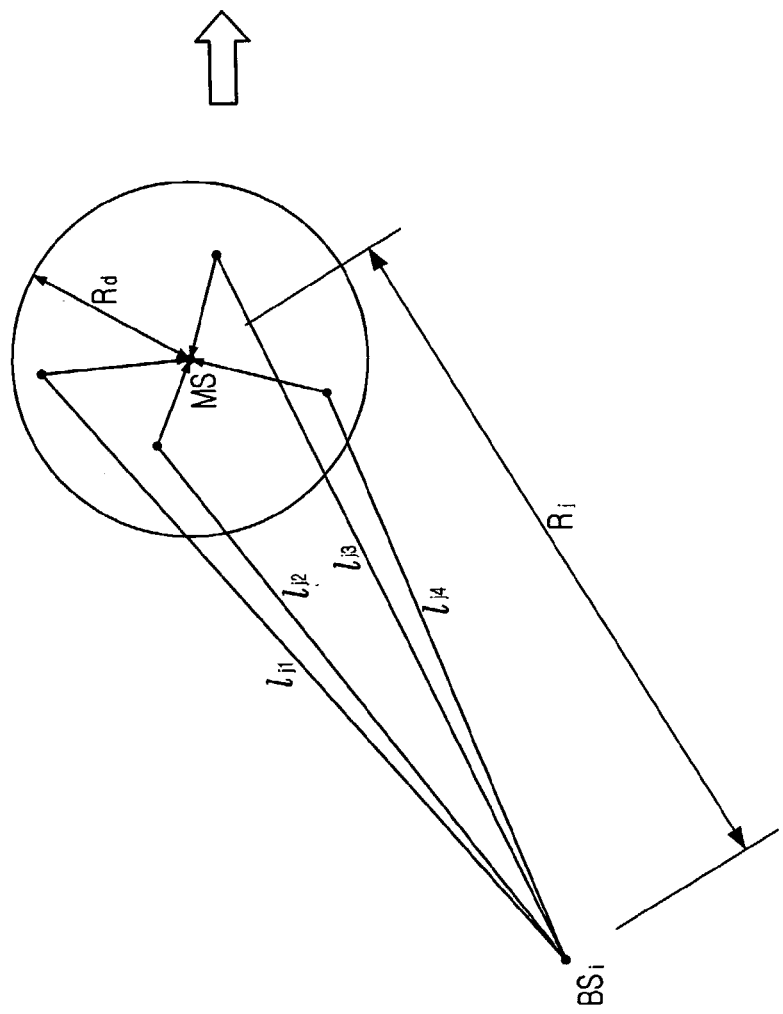

METHOD FOR CORRECTING NLOS ERROR IN WIRELESS POSITIONING SYSTEM

FIELD OF THE INVENTION

The present invention relates to a method for correcting a non-line-of-sight (NLOS) error in a wireless positioning system, and a computer-readable recording medium for recording a program that implements the method; and, more particularly, to a method for correcting a NLOS error in a wireless positioning system that enhances the location accuracy by correcting a radio location error, which is caused by NLOS propagation when wireless positioning is performed to determine the location of a mobile station (MS) in a wireless communication system, such as a wireless local loop (WLL), a broadband wireless local loop (B-WLL), a cellular network, personal communications services (PCS), other foreign cellular networks, an international mobile telecommunication-2000 (IMT-2000) system, a universal mobile telecommunication service (UMTS), and the like, and a computer-readable recording medium for recording a program that implements the method.

DESCRIPTION OF RELATED ART

In a mobile communication network including a code division multiple access (CDMA) network, the method of the present invention mitigates possible location error in a wireless positioning system to determine the location of a MS with improved accuracy. Followings are common location error factors and known technologies for taking care of the factors.

1) Multipath Propagation

In dense urban or urban area, multipath propagation becomes an important factor in a system where a mobile station (MS) is positioned by measuring an angle of arrival (AOA) or signal strength. The multipath propagation also causes an error in the estimation of an accurate time of arrival (TOA) or a time difference of arrival (TDOA) measurement in a time-based positioning system. A conventional delay estimator is affected by the multipath. It is most affected by the multipath, when the difference between a multipath and a direct signal is within one chip. Therefore, a super high-resolution technology, such as multiple signal classification (root-MUSIC), or total least square-estimation of signal parameters via rotational invariance techniques (TLS-ESPRIT) is used to detect the multipath component that is not detected in the conventional delay estimator.

2) Hearability

To estimate the location of a MS in a N dimension by using TDOA, range measurements or time delays between MS and at least N+1 number of base stations (BSs) is needed. That is, to perform wireless positioning in two dimensions in a code division multiple access (CDMA) mobile communication network, the time delays between MS and at least three BSs should be estimated. Therefore, estimating time delays with other BSs works as an important factor for positioning, and the capability of receiving more than 3 signals is called 'hearability'.

A CDMA mobile communication network is interference-limited. Since the CDMA network should reduce interference to maximize system capacity and provide good quality of service to users, it is harder to receive more than 3 signals from neighbor cells. Also, strong transmitted signal of the home cell works as a strong interference to weak signals from neighbor cells and degrades the hearability. Accordingly, the estimation error of the time delays from neighbor BSs is increased. Some methods are suggested to solve this problem: an idle period downlink (IPDL) technique increases hearability by stopping the transmission of signals of the home cell temporarily, and an interference cancellation technique by removing the home cell signal.

3) Non-Line-of-Sight (NLOS) Error

A NLOS signal is reflected and diffracted, so it passes longer path than that of a direct (LOS) signal. This reduces the accuracy of a wireless positioning system using TOA and TDOA, although super high-resolution technology is used in an environment without multipath. According to the measurement result of a global system for mobile communications (GSM), the statistical error caused by the NLOS propagation reaches 400~700 m in the downtown area of a city.

The conventional position fixing algorithm can estimate the location of a MS accurately, only when there are LOS components between the BS and the MS. NLOS propagation causes a bias component in the measurements of TOA or TDOA. The location of a MS obtained by the NLOS measurement is deviated from the actual position. This problem cannot be solved with the position fixing algorithm alone. Therefore, a method that can mitigate the NLOS error is required to improve the performance of the positioning system, because the NLOS error works as the most important factor that degrades the positioning performance.

Generally, wireless positioning technologies can be classified as network-based, handset-based technologies. Technologies on positioning a MS are described more in detail, herein.

First, the network-based technology determines the location of a MS using the BSs in a mobile communication network. The parameters required in this technology are AOA, TOA, TDOA, amplitude, phase and signal strength. In the network-based technology, the calculation for obtaining MS location is performed on the network side, using these parameters. The network-based technology is also divided into a method where the parameters are received by the BS, or a method where the parameters are received by a MS and then transmitted to the network. The network-based technology has an advantage that it can perform position fixing without any additional equipment or change in the existing MS.

The handset-based technology may be called a GPS-based technology. That is, the location of a MS is determined using the signal information from GPS satellites, which is received by a GPS module mounted on the MS. The location can be determined by the GPS module, or determined by performing data transmission/reception between an equipment of the network having information on the GPS satellites and a MS having the GPS module. In case where an external GPS is used, the GPS should be purchased separately. Therefore, it is expensive and uncomfortable to carry due to the big size.

There is another method that positions an MS using a sector identification (ID) of a BS, without using a special positioning technology. However, since the coverage of a sector is different from each cell in the mobile communication system, the location accuracy has a large deviation.

Hybrid technology that takes the advantages of network-based and handset-based technology is studied actively.

The method of the present invention, among them all, can be applied to both network-based and handset-based technology. Particularly, the method of the present invention is suitable for a technology where a MS calculates its location using a received signal, or transmits the received signal information to the network to calculate its location. In other words, when it is assumed that a MS has received three or more forward pilot signals to determine its location at an arbitrary location in a CDMA network, the signals include an error caused by the NLOS propagation. The method of the present invention corrects the error generated here.

Some NLOS error correction algorithms are suggested to mitigate the NLOS error in a wireless positioning system using a mobile communication network. First, there is a method that uses the variance (or standard deviation) of range measurements to distinguish LOS and NLOS signals. That is, the LOS and NLOS signals are distinguished by the signal variance, because the variance of range measurements is higher for NLOS signals than LOS signals. When the signal from the NLOS BS is reconstructed into LOS signal; Kalman filtering technique is used. However, this method has a problem that variance should be known in advance to distinguish whether a BS is LOS or NLOS, and signals should be received continuously to perform signal reconstruction.

Secondly, there is a method where the signal transmitted from a MS is reconstructed closely to a LOS signal. To use this method, the MS should be in motion, and the statistical characteristics of noise and NLOS signals should be known in advance, too.

Thirdly, there is a method putting weight on the residual. Signals from a BS are grouped into several subsets to make estimates, and mean value is calculated, putting different weights on these subsets according to the residual. Here, the residual works as a parameter for distinguishing NLOS BSs, and the weight corrects the error caused by NLOS. This method can be performed only when the signals received from BSs are more than 4 or 5.

Similarly, there is a method that uses AOA. This method, too, should receive signals to estimate the location of a MS. Besides, there is a method that performs location estimation under the assumption that only one signal among several BS signals is received through NLOS.

Although various methods are suggested to correct the location error caused by NLOS propagation, most of them are based on an assumption unpractical to operate the algorithm. That is, even if the reality is that only less than three signals can be received by a MS due to hearability, those methods assume a condition where four or five signals are received. The methods also assume that the MS is always in motion. So, when the MS is at a stop or moving at the same speed, the algorithm can cause a large error.

Meanwhile, when a great number of users exist in a small service region like Korea, the mobile communication network such as cellular, PCS and IMT-2000 networks are most likely to be deployed by pico-cell or micro-cell size. In this case, when the wireless positioning system is embodied, mostly, LOS path between the MS and the neighbor BSs does not exist. This happens in a macrocell environment, too. Therefore, it should be understood that NLOS error is always included in the received signals for position fixing, and thus a method that can correct the location error caused by the NLOS error is required.

SUMMARY OF THE INVENTION

It is, therefore, an object of the present invention to provide a method for correcting non-line-of-sight (NLOS) error in a wireless positioning system, which can improve the location accuracy by correcting the location error caused by NLOS propagation, and a computer-readable recording medium for recording a program that implements the method.

In accordance with an aspect of the present invention, there is provided a method for correcting a non-line-of-sight (NLOS) error in a wireless positioning system, including the steps of: a) determining whether the number of received signals from a mobile station (MS) is larger than a predetermined number; b) if the number of the received signals from the mobile station is equal to or less than the predetermined number, determining a location of the MS based on a weighting factors obtained through an optimization process with respect to each of the received signals which are assumed to include an error caused by NLOS propagation; and c) if the number of the received signals from the mobile station is larger than the predetermined number, determining a location of the MS based on second moments of the received signals.

In the method for correcting a non-line-of-sight (NLOS) error in a wireless positioning system, the step b) includes the steps of: b1) making constraints and obtaining a weighting factors through an optimization process with respect to each received signal which is assumed to include an error caused by NLOS propagation; and b2) based on the weighting factors, correcting the NLOS error and determining the location of the MS.

In the method for correcting a non-line-of-sight (NLOS) error in a wireless positioning system, the step c) includes the steps of: a) obtaining second moments of a signal which is assumed to include an error caused by NLOS propagation, and comparing the second moments with the theoretical values of the conventional scattering models; b) based on the comparison result, obtaining the LOS range measurement and the parameters of the scattering models; and c) based on the obtained values, correcting the NLOS error and determining the location of a MS through a known position fixing algorithm.

In accordance with another aspect of the present invention, there is provided a computer-readable recording medium for recording a program for executing a) determining whether the number of received signals from a mobile station (MS) is larger than a predetermined number; b) if the number of the received signals from the mobile station is equal to or less than the predetermined number, determining a location of the MS based on a weighting factors obtained through an optimization process with respect to each of the received signals which are assumed to include an error caused by NLOS propagation; and c) if the number of the received signals from the mobile station is larger than the predetermined number, determining a location of the MS based on second moments of the received signals.

The method of the present invention improves the location accuracy of a wireless positioning system that positions a MS in mobile communication network. It mitigates the problem of degrading positioning performance caused by an error in estimating TOA of a NLOS propagation, which is frequently occurred in the dense urban or urban area.

Accordingly, the present NLOS error correction method for a wireless positioning system suggests a method for improving the location accuracy by correcting the location error caused by the NLOS propagation when a MS is positioned in mobile communication network in accordance with an embodiment, and in another embodiment, it suggests a method for improving the location accuracy by using a mean and variance matching algorithm (MVMA) that uses a moment of a probability and statistics theory based on a scattering model.

BRIEF DESCRIPTION OF THE DRAWINGS

The above and other objects and features of the present invention will become apparent from the following description of the preferred embodiments given in conjunction with the accompanying drawings, in which:

FIGS. 12A and 12B are exemplary diagrams showing the ROS scattering model and the DOS scattering model, which are received in the NLOS error correction method in accordance with another embodiment of the present invention;

DETAILED DESCRIPTION OF THE INVENTION

Other objects and aspects of the invention will become apparent from the following description of the embodiments with reference to the accompanying drawings, which is set forth hereinafter.

Figure 1:
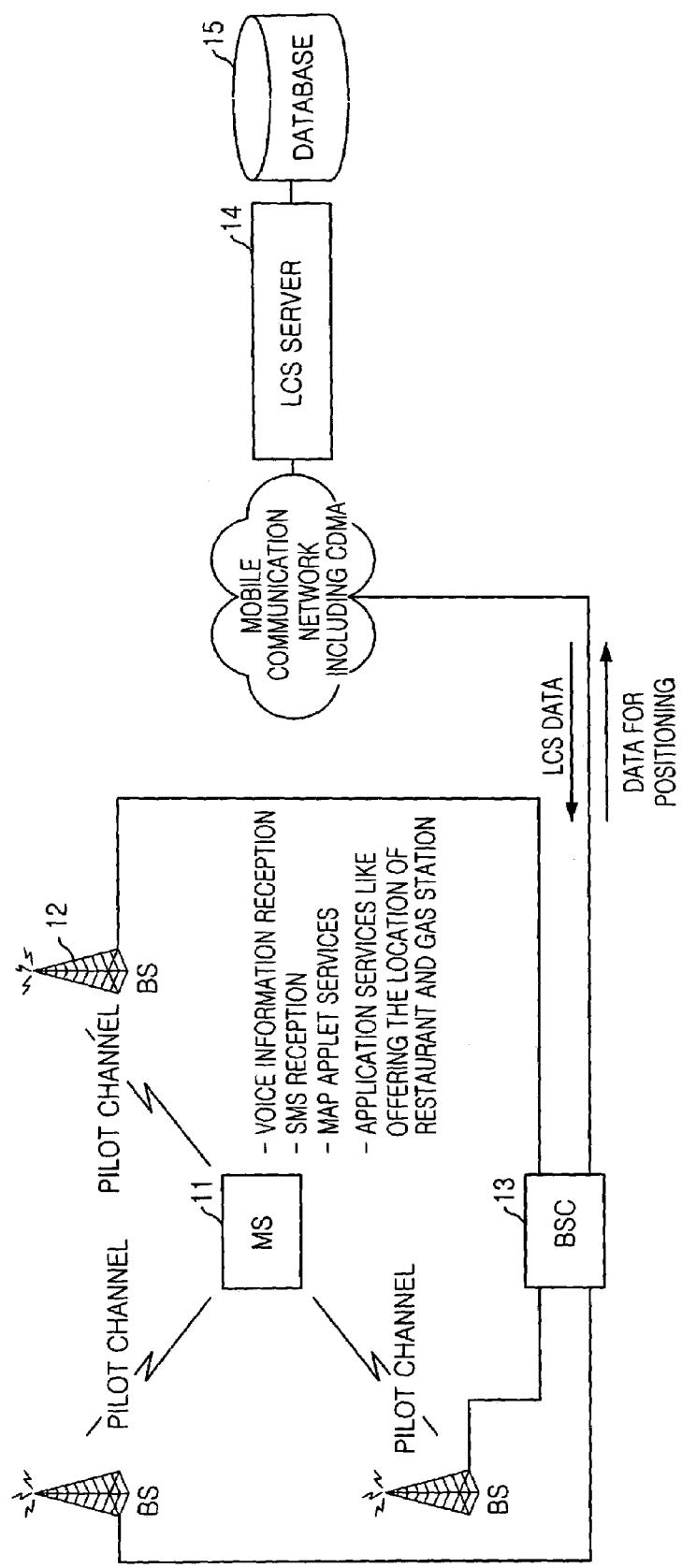
FIG. 1 is a block diagram showing a wireless positioning system in accordance with the present invention.

FIG. 1 is a block diagram showing a structural example of a wireless positioning system in accordance with the present invention. In the drawing, the wireless positioning system includes: a mobile station (MS) 11, a base station (BS) 12, a base station controller (BSC) 13, a location service (LCS) server 14, a geographic information system (GIS) 15, and a database (DB).

Since a code division multiple access (CDMA) mobile communication system environment is widely known to those skilled in the art, any further description on the CDMA system will be omitted herein.

The MS 11 is in the service coverage of an arbitrary BS 12, and the information of the MS 11 is transmitted to a mobile switching center (MSC) of the CDMA network through the BS 12 and the BSC 13 that controls the BS 12. The information transmitted from the MSC is sent out to the MS 11 through the BSC 13 and the BS 12.

The MS 11 is a mobile station, or a cell phone, that a user can carry with and communicate with other people while moving. The BS 12 connects the MS 11 to the BSC 13. It includes a digital channel unit (DCU), a timing/frequency control unit (TCU), and a radio frequency unit (RFU), and it may further include a global positioning system (GPS). The BS 12 can convert into a wired or wireless communication mode, since it performs wireless communication with the MS 11 and wired communication with the BSC 13.

The BSC 13 connects the BS 12 to the MSC 14 and controls the connection among the BSs 12. The BSC 13 processes the communication signals between the BS 12 and the MSC 14. The MSC 14 is connected with the BSC 13 and performs the functions of establishing and releasing a call with the MS 11. Besides, it processes calls and various functions related to additional services.

Functions of the components in a positioning system are described, hereinafter. The BS 12 performs wired/wireless communication conversion. It communicates with the MS 11 wirelessly, and communicates with the BSC 13 through wires. That is, the BS 12 receives a positioning signal from the MS 11 through a wireless channel and transmits the signal to the BSC 13 through the wired channel. Then, it transmits the grade of charge based on the confirmed location to the MS 11.

The BSC 13 connects the BS 12 to the CDMA mobile communication network, controls the connections among the BSs 12, and processes communication signals between the BS 12 and the CDMA communication network. It transmits the information related to the determination of a location to a location service (LCS) server 14 through the CDMA communication network.

The LCS server 14 searches the GIS DB 15 at the BSC's request for location and sends out the search result to the BSC 13 through the CDMA mobile communication network. The MS 11, then, displays the data of charge grade based on the location information transmitted from the BS 12. The NLOS error correction process is described, herein, in accordance with an embodiment of the present invention.

To solve the above-mentioned problems, in the present invention, two embodiments are disclosed. One is a method for correcting an error caused by NLOS propagation based on weighting factors in a mobile communication network, and the other is an NLOS error correction method using second moments, i.e., mean and variance values. The first one has a small amount of computation and a shorter computation time, in view of a simulation result, which is preferred when the number of the received signals is less than ten (10). The other has a better performance and a larger amount of computation, which is preferred when the number of the received signals is equal to or larger than ten (10).

EMBODIMENT 1

The method for correcting an error caused by NLOS propagation based on weighting factors in accordance with one embodiment will be described. The method includes following characteristics.

In the first place, the algorithm does not require any preliminary information on whether the signal from the BS 12 is transmitted through LOS or NLOS path.

Secondly, the algorithm does not require any preliminary statistical characteristics on the signals transmitted through NLOS path.

Thirdly, the algorithm does not require receiving signals continuously.

Fourthly, it does not need to receive more than four or five signals. It operates with only three signals to correct an error.

In general, a range $R_i$ between the $i^{th}$ BS and a MS is expressed as an equation 1.

$$R_i = \sqrt{(x-x_i)^2+(y-y_i)^2}, \quad i=1, 2, 3 \qquad \text{Eq. 1}$$

Generally, the range expressed by the equation 1 includes an error caused by NLOS propagation. This is the characteristic of a mobile communication channel. The relationship between the true range and the error-including range $l_i$ can be expressed as an equation 2.

$$R_i = \alpha_i l_i \qquad \text{Eq. 2}$$

With respect to NLOS propagation, $\alpha_i$ has a value larger than zero and not more than 1 ($0 < \alpha_i \leq 1$). When the equation 2 is put into the equation 1 and both terms are squared, an equation 3 is obtained as follows.

$$\alpha_i^2 l_i^2 = (x-x_i)^2+(y-y_i)^2, \quad i=1, 2, 3 \qquad \text{Eq. 3}$$

The parameters $\alpha$, $\beta$ and $\gamma$ are defined as shown in an equation 4, to develop the equation easily.

$$\alpha = \alpha_1^2$$
$$\beta = \alpha_2^2$$
$$\gamma = \alpha_3^2 \qquad \text{Eq. 4}$$

The method of the present invention estimates the location of the MS by obtaining the values $\alpha$, $\beta$ and $\gamma$, and expressing received signals based on LOS signals. By doing so, the location of the MS, of which the NLOS error is corrected, can be obtained.

Figure 2:
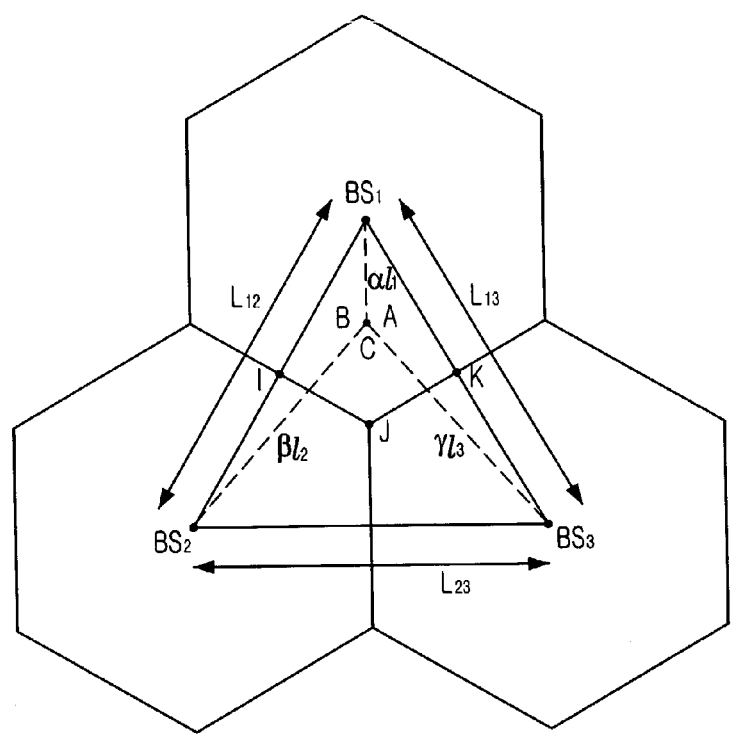
FIG. 2 is a cell layout illustrating the distance between a true range and a base station (BS) in accordance with an embodiment of the present invention.

When a general cell layout, such as the FIG. 2, is considered to determine the relationship between the parameters that are needed to obtain the values $\alpha$, $\beta$ and $\gamma$, the relationship between the true range and the NLOS range can be understood. By using trigonometric relationships, dividing them with $L_{12}^2 L_{13}^2 L_{23}^2$ to normalize it, the equation 2 can be expressed as an equation 5, when it is shown in the form of a matrix.

$$g(v) = v^T H v + G v + 1 = 0 \qquad \text{Eq. 5}$$

wherein the v, H and G are as follows.

$$v = [\alpha \; \beta \; \gamma]^T$$

$$H = \begin{bmatrix} C_1 & C_4 & 0 \\ 0 & C_2 & C_5 \\ C_6 & 0 & C_3 \end{bmatrix}.$$

$$G = [C_7 \; C_8 \; C_9]$$

$$C_1 = \frac{l_1^4}{L_{12}^2 L_{13}^2}$$

$$C_2 = \frac{l_2^4}{L_{12}^2 L_{23}^2}$$

$$C_3 = \frac{l_3^4}{L_{13}^2 L_{23}^2}$$

$$C_4 = l_1^2 l_2^2 \left( \frac{1}{L_{13}^2 L_{23}^2} - \frac{1}{L_{12}^2 L_{23}^2} - \frac{1}{L_{13}^2 L_{12}^2} \right)$$

$$C_5 = l_2^2 l_3^2 \left( \frac{1}{L_{13}^2 L_{12}^2} - \frac{1}{L_{12}^2 L_{23}^2} - \frac{1}{L_{13}^2 L_{23}^2} \right)$$

$$C_6 = l_1^2 l_3^2 \left( \frac{1}{L_{12}^2 L_{23}^2} - \frac{1}{L_{13}^2 L_{23}^2} - \frac{1}{L_{13}^2 L_{12}^2} \right)$$

$$C_7 = l_1^2 \left( \frac{L_{23}^2}{L_{12}^2 L_{13}^2} - \frac{1}{L_{13}^2} - \frac{1}{L_{12}^2} \right)$$

$$C_8 = l_2^2 \left( \frac{L_{13}^2}{L_{12}^2 L_{13}^2} - \frac{1}{L_{12}^2} - \frac{1}{L_{23}^2} \right)$$

$$C_9 = l_3^2 \left( \frac{L_{12}^2}{L_{13}^2 L_{23}^2} - \frac{1}{L_{13}^2} - \frac{1}{L_{23}^2} \right)$$

Another constraints can be obtained to determine the parameters $\alpha$, $\beta$ and $\gamma$.

Figure 3:
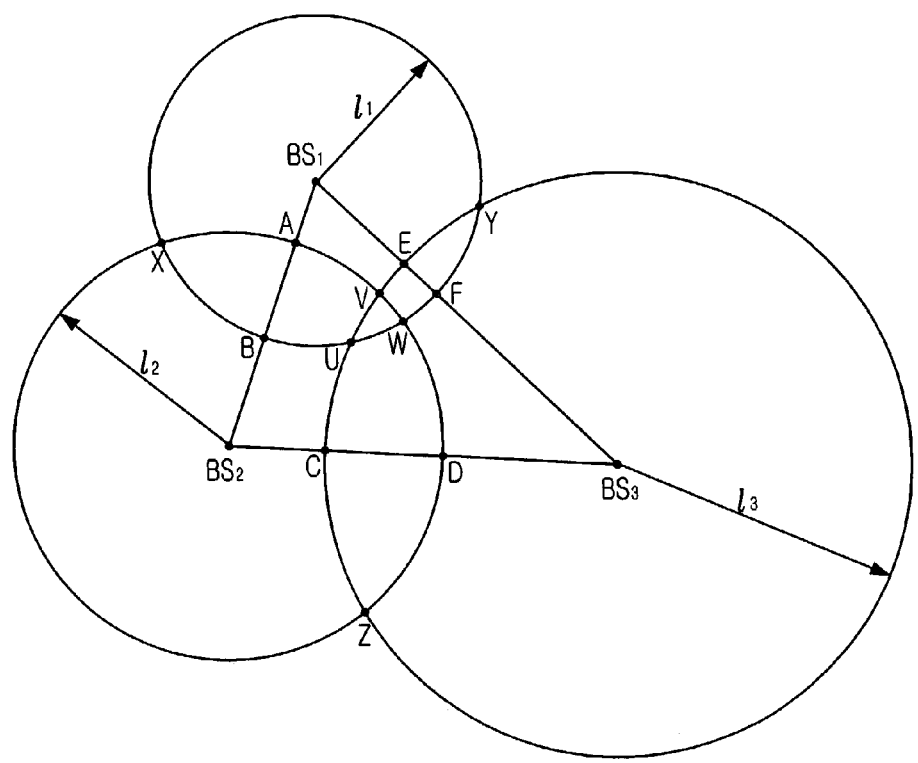
FIG. 3 is an exemplary view showing measured range circles including an error caused by non-line-of-sight (NLOS) propagation in accordance with an embodiment of the present invention.

Referring to FIG. 3, since the NLOS error always has a positive value, the measured range is larger than the true range, and the MS located where the circles are overlapped, which is the region surrounded with the points U, V and W in the drawing. If it is assumed that the $BS_2$ is LOS and the distance determined by a received signal is the true range, when the true range from the $BS_1$ is smaller than $l_1 - \overline{AB}$, the circles drawn by the distance from $BS_1$ and $BS_2$ are not overlapped with each other. Since a circle drawn by the true range should be crossed over at one point, which is impossible. Accordingly, the NLOS error ($\eta_1$) at $BS_1$ cannot be larger than $\overline{AB}$. In the same way, the NLOS error $\eta_1$ cannot be larger than $\overline{EF}$. Therefore, the upper bound of $\eta_1$ is determined as shown in an equation 6.

$$\max \eta_1 = \min\{\overline{AB}, \overline{EF}\} \qquad \text{Eq. 6}$$

In the same method, the upper bound for $\eta_2$ and $\eta_3$ can be obtained as shown in an equation 7.

$$\max \eta_2 = \min\{\overline{AB}, \overline{CD}\}$$

$$\max \eta_3 = \min\{\overline{CD}, \overline{EF}\} \qquad \text{Eq. 7}$$

Here, the lower bounds for $\alpha_1$, $\alpha_2$ and $\alpha_3$ are expressed in the same method as in an equation 8.

$$\alpha_{1,min} = \max\left\{1 - \frac{\overline{AB}}{l_1}, 1 - \frac{\overline{EF}}{l_1}\right\} = \max\left\{\frac{L_{12}-l_2}{l_1}, \frac{L_{13}-l_3}{l_1}\right\} \qquad \text{Eq. 8}$$

$$\alpha_{2,min} = \max\left\{\frac{L_{12}-l_1}{l_2}, \frac{L_{23}-l_3}{l_2}\right\}$$

$$\alpha_{3,min} = \max\left\{\frac{L_{13}-l_1}{l_3}, \frac{L_{23}-l_2}{l_3}\right\}$$

Accordingly, the lower bounds for the parameters $\alpha$, $\beta$ and $\gamma$ can be expressed as an equation 9.

$$\alpha_{min}=\alpha_{1,min}^2$$

$$\beta_{min}=\alpha_{2,min}^2$$

$$\gamma_{min}=\alpha_{3,min}^2 \qquad \text{Eq. 9}$$

Meanwhile, determining the location of a MS may be, actually, a matter of optimization under the constraints, such as the lower bound. That is, in FIG. 3, the MS exists within the location range of the points U, V and W according to the received signal, and the cost function that should be optimized is the part where the circles are overlapped, which is the part surrounded by the points U, V and W. When the coordinates of the points U, V and W are $(U_x, U_y)$, $(V_x, V_y)$ and $(W_x, W_y)$, respectively, the cost function that should be optimized is expressed as an equation 10, which is shown below.

$$f(x,y)=(x-U_x)^2+(y-U_y)^2+(x-V_x)^2+(y-V_y)^2+(x-W_x)^2+(y-W_y)^2 \qquad \text{Eq. 10}$$

By rearranging the true range equation based on a linear line of position (LLOP) algorithm, it can be written in the form of a matrix as an equation 11 below.

$$Ax=b \qquad \text{Eq. 11}$$

wherein A, x and b can be expressed as follows.

$$A = \begin{bmatrix} 2(x_1-x_2) & 2(y_1-y_2) \\ 2(x_3-x_2) & 2(y_3-y_2) \end{bmatrix}$$

$$x = \begin{bmatrix} x \\ y \end{bmatrix}$$

$$b = \begin{bmatrix} \beta \cdot l_2^2 - \alpha \cdot l_1^2 + K_1 - K_2 \\ \beta \cdot l_2^2 - \alpha \cdot l_3^2 + K_3 - K_2 \end{bmatrix}$$

Accordingly, the location of the MS can be obtained from an equation 12.

$$x=A^{-1}b \qquad \text{Eq. 12}$$

Here, an equation 13 can be obtained by putting the equation 12 into the equation 10, the cost function and thereby rewriting it in a function of $\alpha$, $\beta$ and $\gamma$.

$$f(\alpha,\beta,\gamma)=D_1\alpha^2+D_2\beta^2+D_3\gamma^2+D_4\alpha\beta+D_5\beta\gamma+D_6\alpha\gamma+D_7\alpha+D_8\beta+D_9\gamma+D_{10} \qquad \text{Eq. 13}$$

wherein $D_1$ to $D_{10}$ are as follows:

$$D_1 = 12(b^2+a^2) \cdot \frac{l_1^4}{K_{13}^2}$$

$$D_2 = 12(a^2+b^2+c^2+d^2-ab-cd) \cdot \frac{l_2^4}{K_{13}^2}$$

$$D_3 = 12(a^2+c^2) \cdot \frac{l_3^4}{K_{13}^2}$$

$$D_4 = -24(b^2+d^2-ab-cd) \cdot \frac{l_1^2 l_2^2}{K_{13}^2}$$

$$D_5 = -24(a^2+c^2-ab-cd) \cdot \frac{l_2^2 l_3^2}{K_{13}^2}$$

$$D_6 = -24(ab+cd) \cdot \frac{l_1^2 l_3^2}{K_{13}^2}$$

$$D_7 = (-24(b^2+d^2)(K_1-K_2)+24(ab+cd)(K_3-K_2)-$$

$$2dS_x K_{13}+2bS_y K_{13}) \cdot \frac{l_1^2}{K_{13}^2}$$

$$D_8 = [24(b^2+d^2)(K_1-K_2)+24(a^2+c^2)(K_3-K_2)-$$

$$24(ab+cd)(K_1+K_3-2K_2)+2K_{13}(aS_y-bS_y-cS_x+dS_x)] \cdot \frac{l_2^2}{K_{13}^2}$$

$$D_9=(-24(a^2+c^2)(K_3-K_2)+24(ab+cd)(K_1-K_2)-2cS_xK_{13}+2aS_yK_{13})\cdot l_3^2 K_{13}^2$$

$$D_{10}=[12(b^2+d^2)(K_1-K_2)^2+12(a^2+c^2)(K_3-K_2)^2-24(ab+cd)(K_1-K_2)(K_3-K_2)+2K_{13}\{(aS_y-cS_x)(K_3-K_2)-(bS_y-dS_x)(K_1-K_2)\}+K_{13}^2 S_{xy}]/K_{13}^2$$

, and a to d, $K_{13}$, $S_x$, $S_y$ and $S_{xy}$ are as follows:

$$a=x_1-x_2$$

$$b=x_3-x_2$$

$$c=y_1-y_2$$

$$d=y_3-y_2$$

$$K_{13}=4(ad-bc)$$

$$S_x = -2\frac{U_x+V_x+W_x}{K_{13}}$$

$$S_y = -2\frac{U_y+V_y+W_y}{K_{13}}$$

$$S_{xy}=U_x^2+V_x^2+W_x^2+U_y^2+V_y^2+W_y^2$$

When the above equation is rewritten in the form of a matrix, an equation 14 below can be obtained.

$$F(v)=v^T Mv+Nv+P \qquad \text{Eq. 14}$$

wherein v, M, N and P are as follows.

$$v=[\alpha \ \beta \ \gamma]^T$$

$$M = \begin{bmatrix} D_1 & D_4 & 0 \\ 0 & D_2 & D_5 \\ D_6 & 0 & D_3 \end{bmatrix}$$

$$N=[D_7 \ D_8 \ D_9]$$

$$P=D_{10}$$

The equation for obtaining an optimized vector that indicates the final location of the MS is as shown in an equation 15.

Minimize $F(v)$

Subject to $g(v)=0$ $LB \leq v \leq UB \qquad \text{Eq. 15}$ wherein the LB and UB are as follows.

$$LB = \begin{bmatrix} \alpha_{min} \\ \beta_{min} \\ \gamma_{min} \end{bmatrix}$$

$$UB = \begin{bmatrix} 1 \\ 1 \\ 1 \end{bmatrix}$$

Therefore, under the constraints given in the equation 15, the optimized vector $\bar{v}$ is obtained: $\hat{v}$=arg min F(v). From this vector, the mobile station can be positioned by putting [α,β,γ] into the equation 12.

Figure 4:
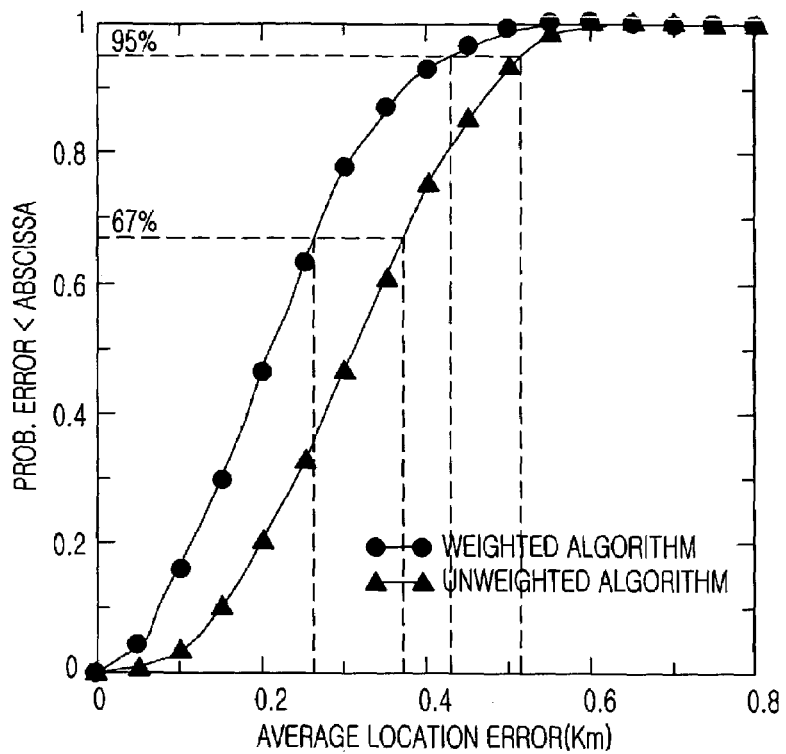
FIG. 4 is a graph comparing the performance of NLOS error correction methods when the cell radius is 5 km, in accordance with an embodiment of the present invention.

A simulation result of the NLOS error correction method in accordance with an embodiment of the present invention is described herein, with reference to FIG. 4, which is a graph comparing the performance of NLOS error correction methods when the cell radius is 5 km, in accordance with another embodiment of the present invention. In the drawing, a weighted algorithm is the performance of the algorithm in accordance with the present invention, while an unweighted algorithm is the performance of a common case. In FIG. 4, an LLOP algorithm is used.

Figure 5:
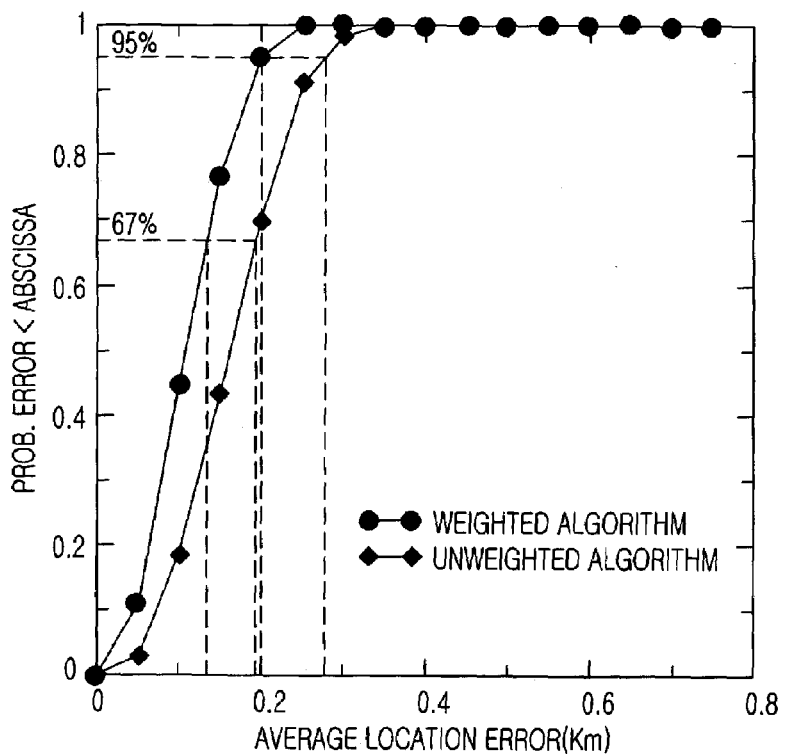
FIGS. 5 and 6 are graphs illustrating performance of NLOS error correction methods when the cell radius is 2 km, in accordance with an embodiment of the present invention.
Figure 6:
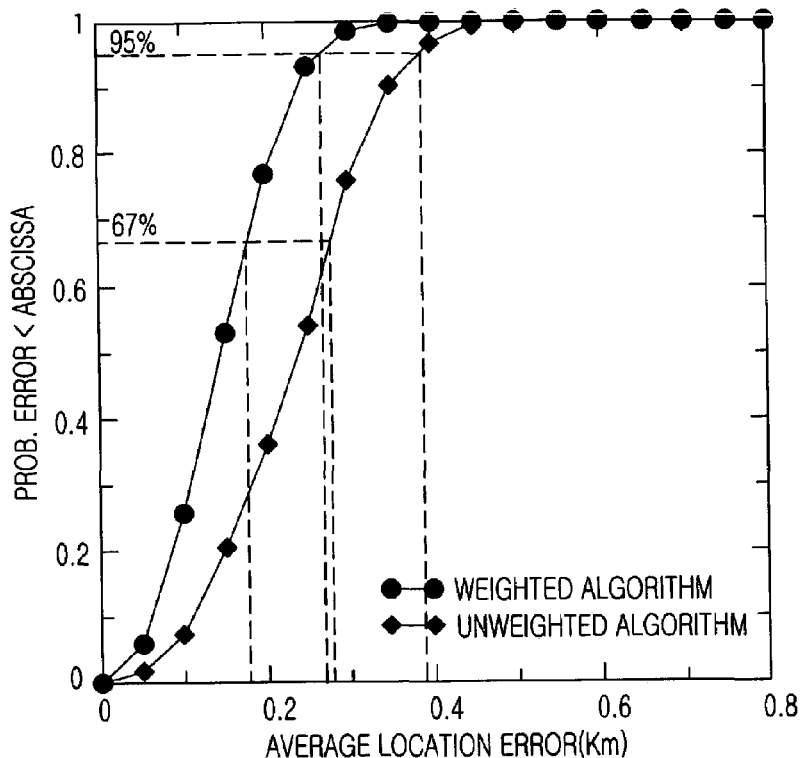

FIGS. 5 and 6 are graphs illustrating the performance of NLOS error correction methods when the cell radius is 2 km, in accordance with an embodiment of the present invention. The NLOS error of FIG. 6 is larger than that of FIG. 5. Therefore, the larger the NLOS error is, the more excellent the error correction performance of the weighted algorithm is.

Figure 7:
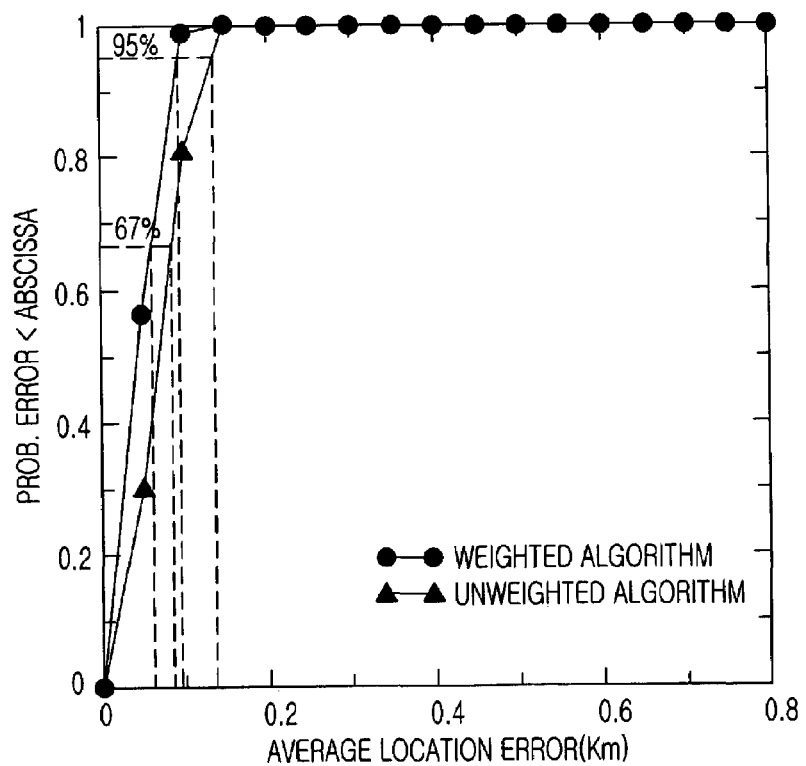
FIGS. 7 and 8 are graphs showing performance of NLOS error correction methods when the cell radius is 1 km, in accordance with an embodiment of the present invention.
Figure 8:
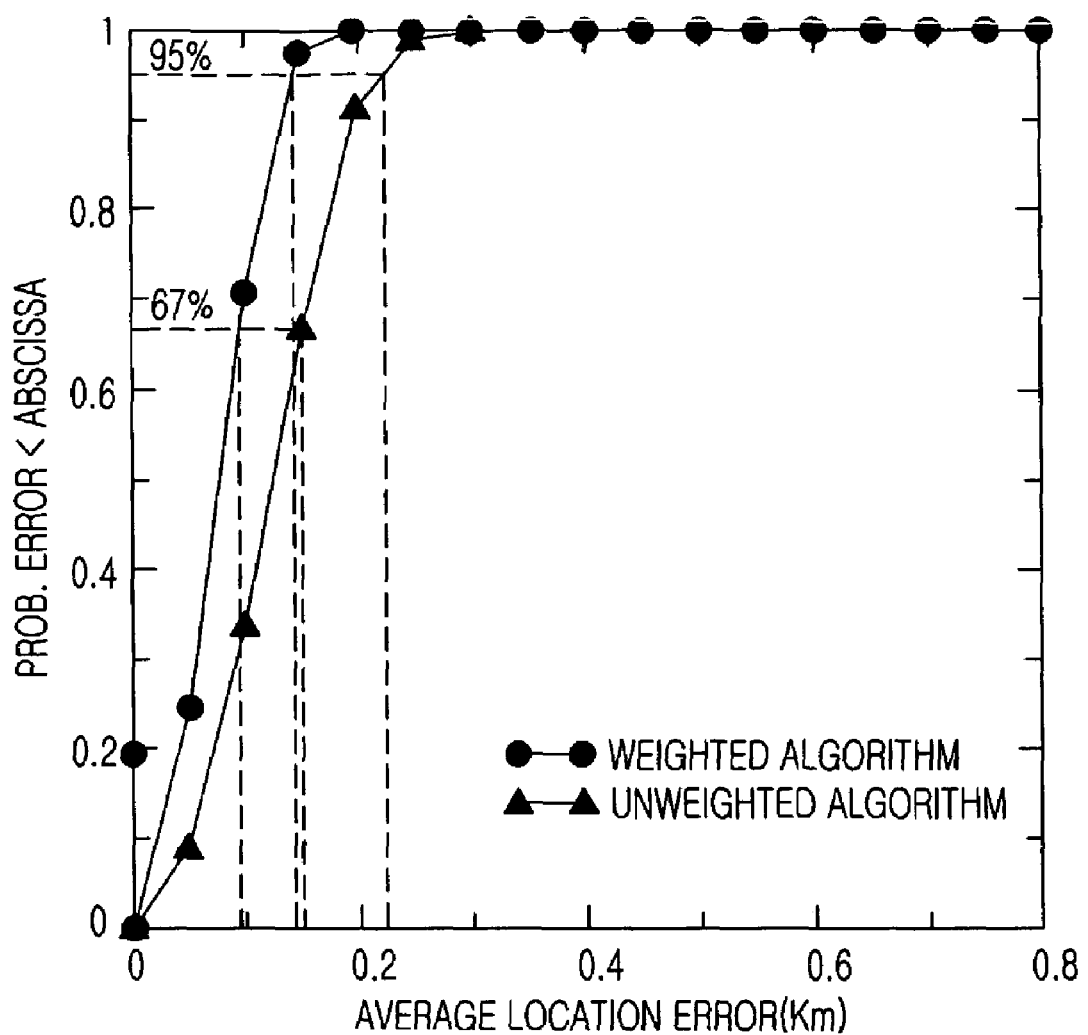

FIGS. 7 and 8 are graphs showing performance of NLOS error correction methods when the cell radius is 1 km, in accordance with an embodiment of the present invention. The NLOS error of FIG. 8 is larger than that of FIG. 7. Therefore, the larger the NLOS error is, the more excellent the error correction performance of the weighted algorithm is. However, as the cell radius becomes small, the errors caused by the NLOS propagation are less corrected.

EMBODIMENT 2

Hereinafter, among the NLOS error correction methods in accordance with another embodiment of the present invention, the operation of an NLOS error correction method using Mean and Variance Matching Algorithm (MVMA) will be described.

In an embodiment of the present invention, MVMA is used to correct an error caused by NLOS propagation in a mobile communication network. This method applies the commonly used scattering channel model to a wireless positioning. It computes the mean and variance, which are the second moment of a received signal, and equates them with those of the actual measurements. Here, the location of the MS whose NLOS error is corrected is determined by applying the distance of a LOS signal obtained above to the general position fixing algorithm.

The algorithm of the present invention is different from the conventional positioning algorithm in the following points.

First, the positioning algorithm of the present invention can be applied to a case where the number of received signals is three, which is the minimum number of signals required for positioning.

Secondly, the algorithm of the present invention can be used regardless of the state of a MS, that is, when the MS is at a stop, moving, or moving at the constant speed.

Thirdly, the algorithm of the present invention can be applied to the positioning in the forward link, which is from BS to MS and the positioning in the reverse link, which is from MS to BS.

Fourthly, the algorithm of the present invention can be used without a preliminary statistics on the signals received through NLOS path.

Fifthly, the algorithm of the present invention can be used without continuous received signals.

Sixthly, the algorithm of the present invention can be used without preliminary information on the received signal whether it passes LOS or NLOS path.

Hereinafter, the operation of the NLOS error correction method using MVMA is described in accordance with the present invention.

1) Scattering Model

A scattering model, represented by the code division testbed (CODIT) model of a universal mobile telecommunication system (UMTS), is commonly used in standardization bodies to evaluate and compare the performance of wireless positioning algorithms.

Although the location of a scatterer changes depending on the location of a MS, there are several common models that show the location of a scatterer, such as ring of scatterers (ROS), disk of scatterers (DOS) and Gaussian distributed scattering models.

These models obtain the mean and variance from the signals transmitted from a BS to the MS, and also obtain the true range $R_i$ whose NLOS error is removed based on the mean and variance. The true range $R_i$ is finally used to calculate the location of the MS.

A) Ring of Scatterers (ROS) Model

Figure 9:
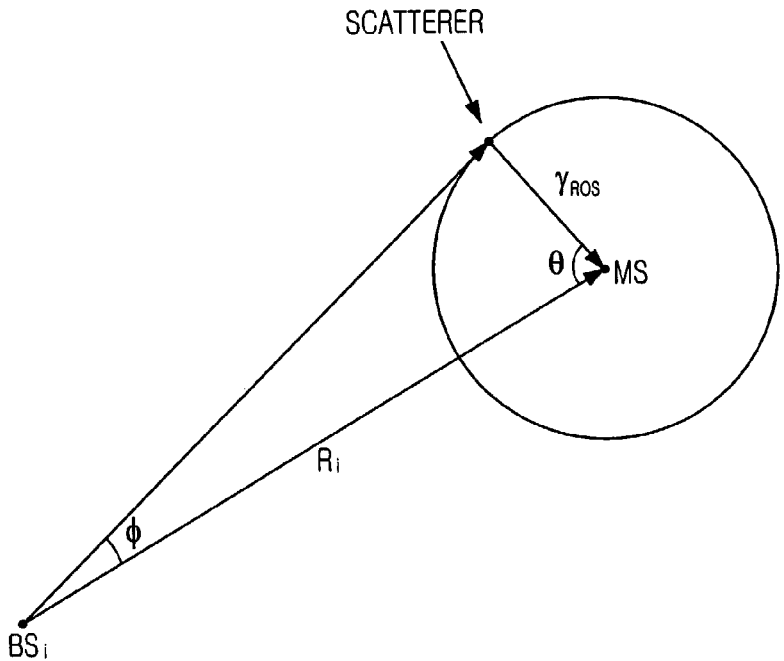
FIG. 9 is an exemplary diagram showing the location of a scatterer, a base station (BS) and a mobile station (MS) in a ring of scatters (ROS) scattering model among the NLOS error correction methods in accordance with another embodiment of the present invention.

In an ROS model, scatterers are located within a circle having a radius $r_{DOS}$ with the MS (i.e., cell phone) at the center, as shown in FIG. 9. The direction-of-arrival θ of a signal transmitted from a MS has a uniform distribution within in the range of [0, 2π].

Referring to FIG. 9, the probability density function (PDF) of a measured range can be expressed as an equation 16, when it is rewritten to the θ and using a cosine law.

$$P_{ROS}(l_i) = \frac{\frac{l_i - r_{ROS}}{\pi r_{ROS} R_i}}{\sqrt{1 - \left(\frac{(R_i - l_i)(R_i + l_i - 2r_{ROS})}{2r_{ROS} R_i} + 1\right)}}, \quad \text{Eq. 16}$$

$$R_i \leq l_i \leq R_i + 2r_{ROS}$$

B) Disk of Scatterers (DOS) Model

Figure 10:
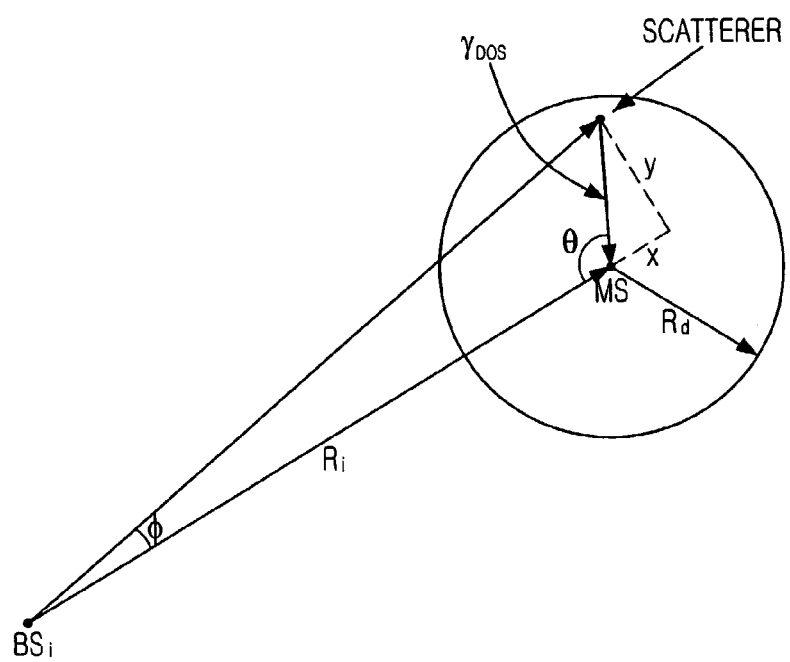
FIG. 10 is an exemplary diagram showing the location of a scatterer, BS and MS in a disk of scatters (DOS) scattering model among the NLOS error correction methods in accordance with another embodiment of the present invention.

In a DOS model, scatterers are located within a circle having a fixed radius $R_d$ with the MS (i.e., cell phone) at the center, as shown in FIG. 10. The distance $r_{DOS}$ from the MS to the scatterer is evenly distributed within the range of [0, $R_d$], and the direction-of-arrival θ of a signal transmitted from the MS has a uniform distribution in the range of [0, 2π].

After converting (x,y) into a function of $(l_i,\phi)$, finding a Jacobian's determinant and integrating with respect to θ, the PDF $P_{DOS}(l_i)$, the final object to be obtained, can be expressed as an equation 17.

$$P_{DOS}(l_i) = \frac{N(l_i)}{D(l_i)} \qquad \text{Eq. 17}$$

wherein $N(l_i)$ and $D(l_i)$ are as follows:

$$N(l_i) = -(l_i - 2R_d)\sqrt{(R_i + 2R_d - l_i)(R_i - 2R_d + l_i)}$$

$$-2(2l_i^2 - R_i^2)\arctan\left(\frac{(l_i + R_i)\tan\left(\frac{1}{2}\arccos\frac{l_i^2 + R_i^2 - 2l_iR_d}{2R_i(l_i - R_d)}\right)}{\sqrt{l_i^2 - R_i^2}}\right)$$

$$D(l_i) = 4\pi R_d^2 \sqrt{l_i^2 - R_i^2}$$

C) Gaussian Distributed Scattering Model

Different from the ROS model or DOS model depending on the radius of a circle or a disk, in the Gaussian distributed scattering model, the scattering environment is determined by a standard deviation $\sigma_g$ of Gaussian distribution.

Figure 11:
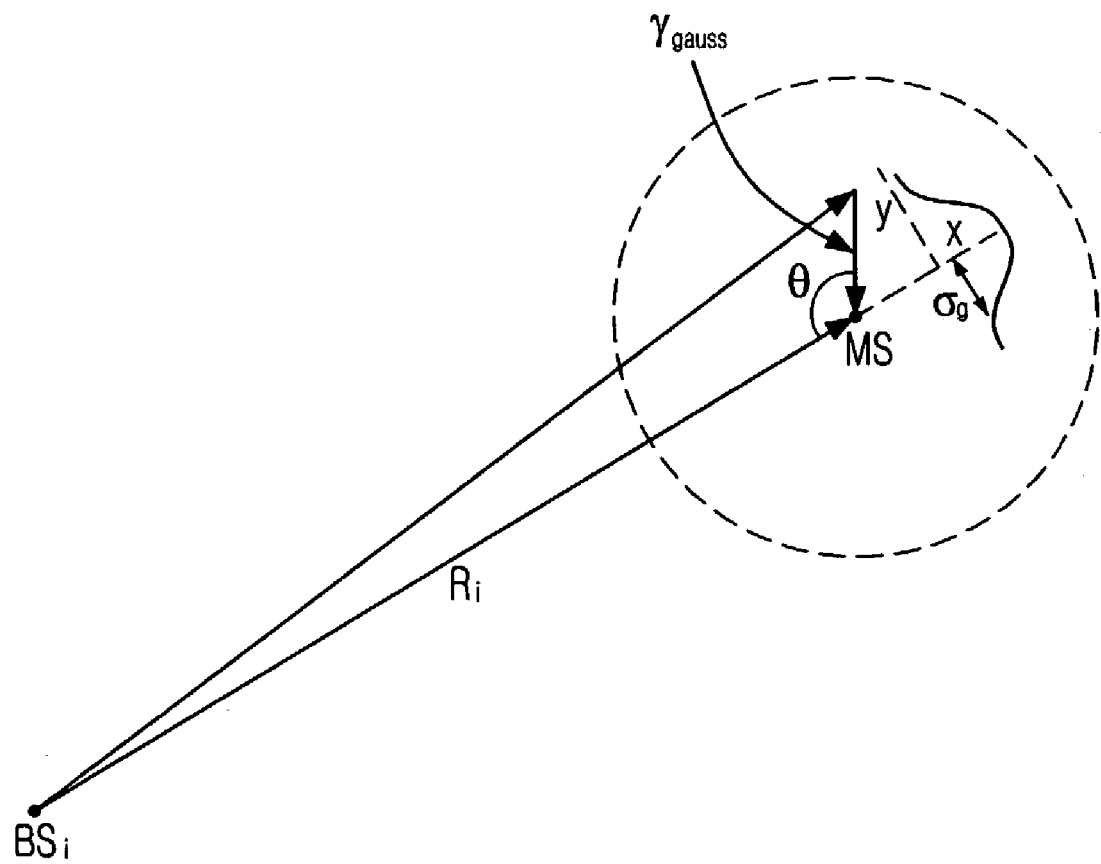
FIG. 11 is an exemplary diagram showing the location of a scatterer, BS and MS in a Gaussian distributed scattering model among the NLOS error correction methods in accordance with another embodiment of the present invention.

With reference to FIG. 11, which describes the Gaussian distributed scattering model, the location of the scatterers is expressed in a PDF as an equation 18 below to obtain the PDF with respect to $l_i$.

$$P_{gauss}(x, y) = \frac{1}{2\pi\sigma_g^2} e^{-\left(\frac{x^2 + y^2}{2\sigma_g^2}\right)} \qquad \text{Eq. 18}$$

wherein $x = r_{gauss} \cos\theta$ and $y = r_{gauss} \sin\theta$.

Using Jacobian in order to express the PDF of the Gaussian distributed scattering model as a function of $r_{guass}$ and $\theta$, instead of a function with respect to x and y, finding the joint PDF of $l_i$ and $\theta$, the marginal PDF of $l_i$ is obtained by integrating joint PDF with respect to $\theta$. However, since there is no closed form solution, a numerical summation is obtained with respect to $\theta$ as shown in an equation 19.

$$P_{gauss}(l_i) = \sum_{\theta=-\pi}^{\pi} P_{gauss}(l_i, \theta) \cdot \Delta\theta \qquad \text{Eq. 19}$$

2) Mean and Variance Matching Algorithm (MVMA)

The method of the present invention can be applied to both forward link, which is from BS to MS, and reverse link, which is from MS to BS. However, for the matter of convenience, only a signal for positioning, which is transmitted from the BS to the MS, will be described in this part of description.

Figure 12A:
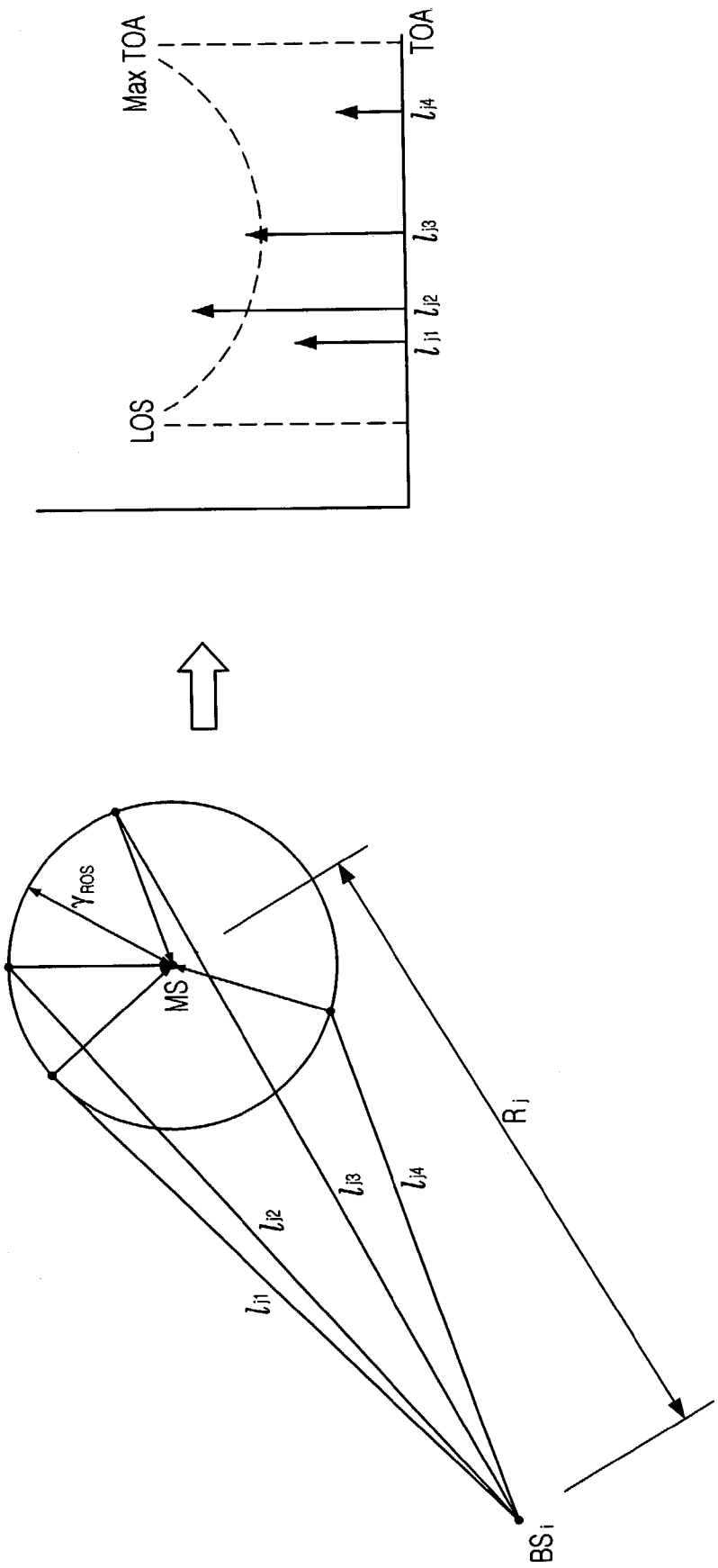

FIGS. 12A and 12B show an actual example of the method of the present invention. In FIG. 12A, the $i^{th}$ TOA wherein a signal is transmitted from $BS_j$ to the MS through multipath propagation is expressed as $l_{ji}$, and the radius of a circle here is expressed as $r_{ROS}$. In FIG. 12B, the $i^{th}$ TOA wherein a signal is transmitted from $BS_j$ to the MS through multipath propagation is expressed as $l_{ji}$, and the radius of a scattering disk here is expressed as $R_d$. In FIGS. 12A and 12B, the TOA distribution shape is shown as dots on a TOA profile in each model. The probability distributions of the scattering models in FIGS. 12A and 12B concerns TOA, and not concerns the intensity or the amplitude of a received signal. A probability distribution of the Gaussian distributed scattering model can be obtained similarly to FIGS. 12A and 12B.

Based on the PDF of the scattering model obtained above, the true range $R_i$ (i.e., LOS distance) between the BS and the MS, and the radius of a scatterer are obtained. The radius of a scatterer is simply marked as r, and r is expressed as an equation 20.

$$r = \begin{cases} r_{ROS} & \text{ROS model} \\ R_d & \text{DOS model} \\ \sigma_g & \text{Gaussian model} \end{cases} \qquad \text{Eq. 20}$$

In MVMA, the $R_i$ and r are obtained based on the fact that the expression on second moments should be the same as the moments calculated from the measured TOA values.

Referring to FIGS. 12A and 12B, the mean of signals including NLOS error, which are transmitted from the BS is shown in an equation 21, and the measured variance is as shown in an equation 22. The statistical mean and the variance are as shown in equations 23 and 24, respectively.

$$\mu_j = \frac{1}{N} \sum_{n=1}^{N} l_{jn} \qquad \text{Eq. 21}$$

$$\sigma_j^2 = \frac{1}{N} \sum_{n=1}^{N} (l_{jn} - \mu_j)^2 \qquad \text{Eq. 22}$$

$$\hat{\mu}_j = \int_{R_j}^{R_j + 2r} l_j p(l_j) dl_j \qquad \text{Eq. 23}$$

$$\hat{\sigma}_j^2 = \int_{R_j}^{R_j + 2r} l_j^2 p(l_j) dl_j - \hat{\mu}_j^2 \qquad \text{Eq. 24}$$

However, in case of the ROS model, it is possible to obtain closed form expression with respect to mean and variance, but it is not possible to obtain a closed form expression in the DOS and Gaussian scattering models. Therefore, in the models from which a closed form of a solution cannot be obtained, other mathematical skill is used to obtain a solution. After that, the location of a MS may be determined by using such methods as linear line of position (LLOP), least square, and Taylor series.

Figure 13:
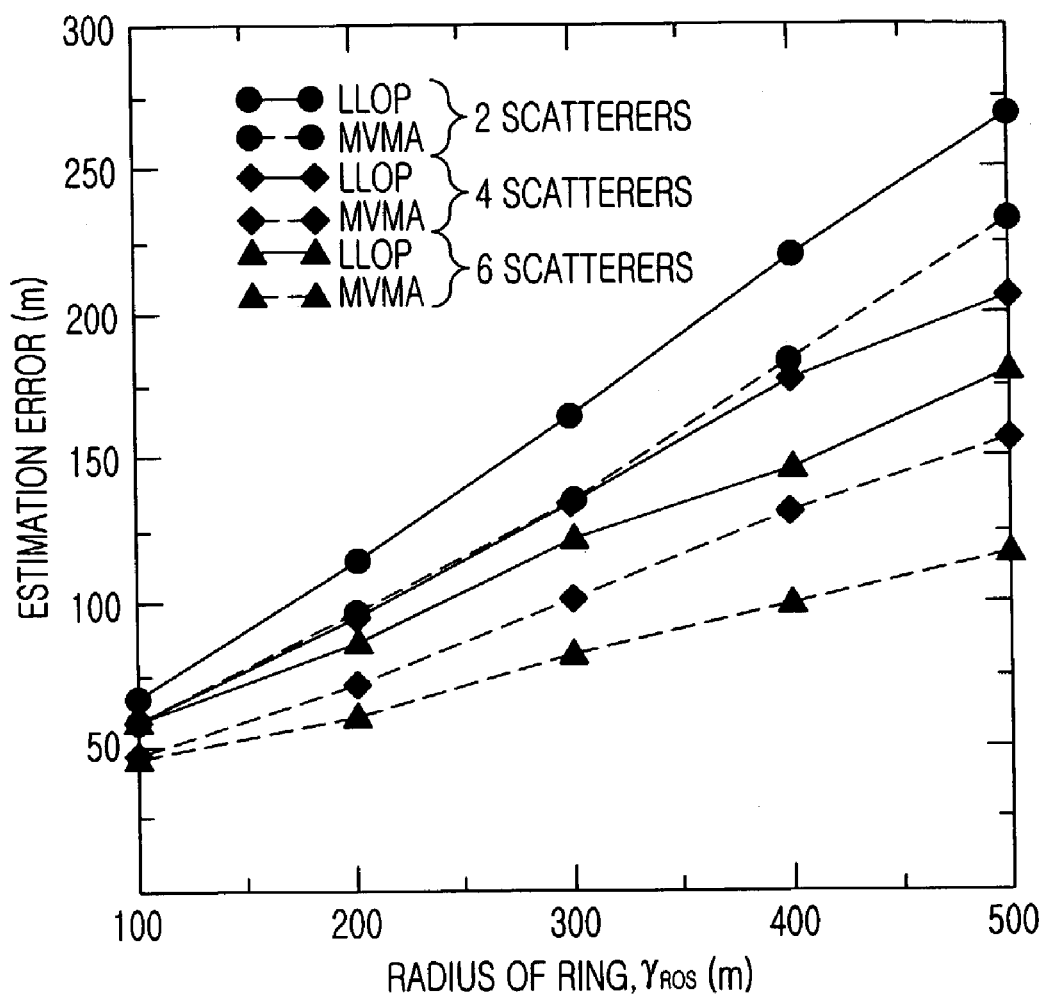
FIG. 13 is a graph showing the performance of the ROS algorithm among the NLOS error correction methods in accordance with another embodiment of the present invention.
Figure 14:
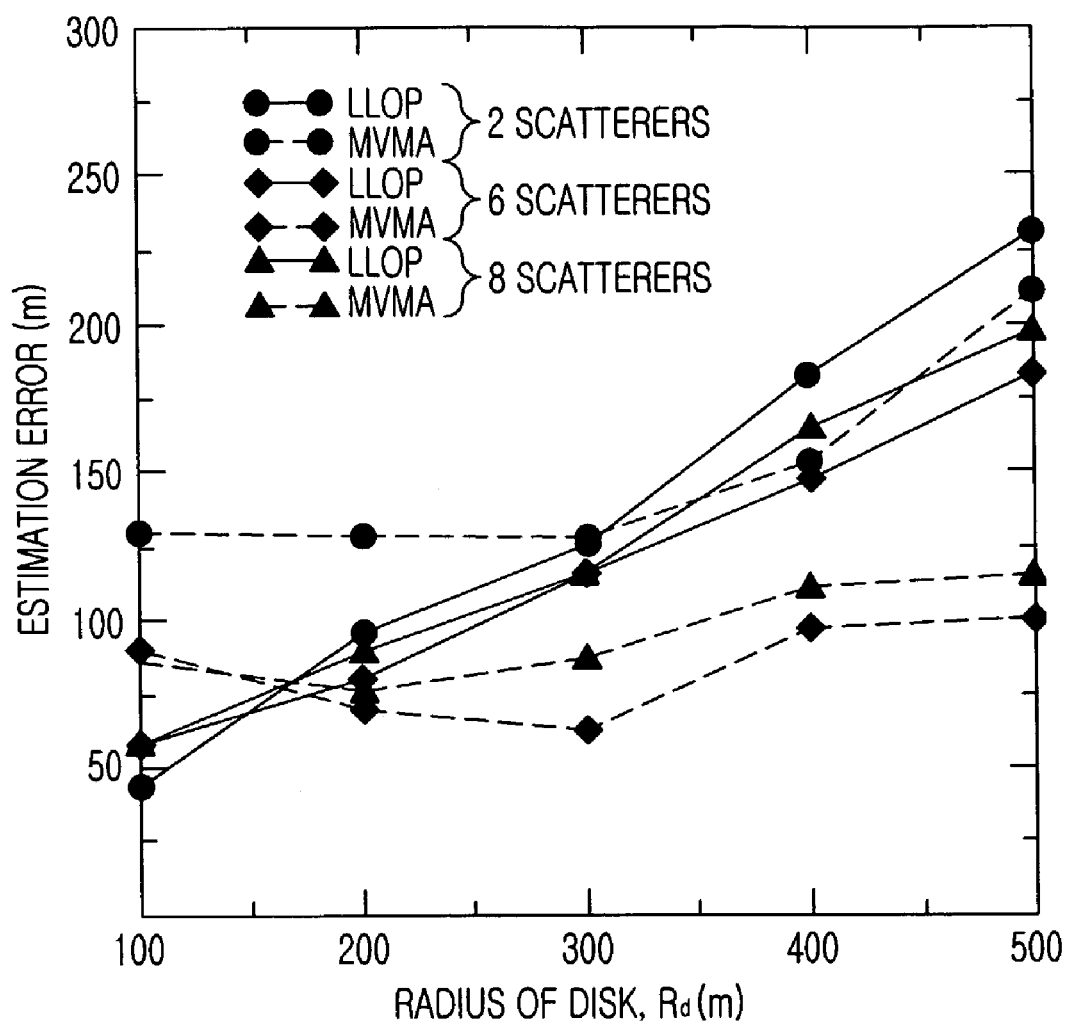
FIG. 14 is a graph showing the performance of the ROS algorithm among the NLOS error correction methods in accordance with another embodiment of the present invention.
Figure 15:
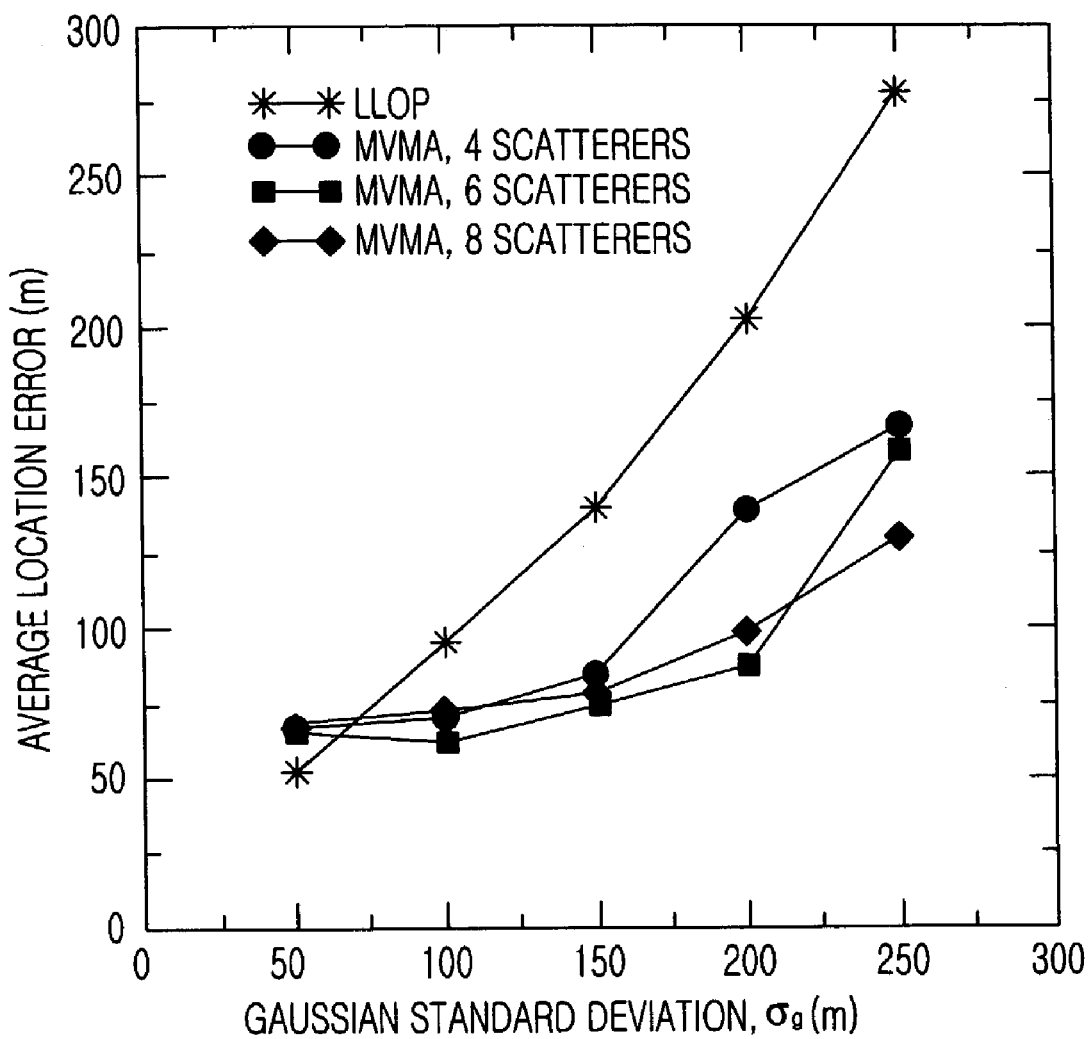
FIG. 15 is a graph showing the performance of the Gaussian algorithm among the NLOS error correction methods in accordance with another embodiment of the present invention.

FIG. 13 is a graph showing the performance of the ROS-algorithm among the NLOS error correction methods in accordance with another embodiment of the present invention. The drawing shows the superiority of the MVMA algorithm in all number of scatterers. FIG. 14 is a graph showing the performance of the ROS algorithm among the NLOS error correction methods in accordance with another embodiment of the present invention. FIG. 14 shows the superiority of the MVMA algorithm in all number of scatterers, in case where the radius of a scatterer is larger than around 200 meters. FIG. 15 is a graph showing the performance of the Gaussian algorithm among the NLOS error correction methods in accordance with another embodiment of the present invention. FIG. 15 shows the superiority of the MVMA algorithm when the algorithm is applied to the Gaussian environment.

A) MVMA for the ROS Model

When the equation 23 is applied to the ROS model, an equation 25 is obtained as follows. When the equation 25 is integrated by parts, an estimated mean value can be obtained as shown in an equation 26.

$$\hat{\mu}_{ROS,j} = \int_{R_j}^{R_j+2r_{ROS}} l_j \left( \frac{\frac{l_j - r_{ROS}}{\pi r_{ROS} R_j}}{\sqrt{1 - \left( \frac{(l_j - r_{ROS})^2 - (R_j^2 + r_{ROS}^2)}{2R_j r_{ROS}} \right)^2}} \right) dl_j \quad \text{Eq. 25}$$

$$\hat{\mu}_{ROS,j} = R_j + 2r_{ROS} - \left( r_{ROS} + \frac{1}{\pi} \frac{317 r_{ROS}^2}{420 R_j} + \frac{1}{\pi} \frac{r_{ROS}^4}{35 R_j^3} + \frac{1}{\pi} \frac{2 r_{ROS}^6}{1155 r_j^5} \right) \quad \text{Eq. 26}$$

In the same way, the variance is obtained as shown in an equation 27.

$$\hat{\sigma}_{ROS,j}^2 = R_j^2 + 4R_j r_{ROS} + 4r_{ROS}^2 - \quad \text{Eq. 27}$$
$$\frac{2}{\pi} \left( \pi R_j r_{ROS} + \pi r_{ROS}^2 + \frac{317 r_{ROS}^3}{420 R_j} + \frac{r_{ROS}^5}{35 R_j^3} + \frac{2 r_{ROS}^7}{1155 R_j} - \hat{\mu}_{ROS,j}^2 \right)$$

Here, the mean and variance of the equation 26 and 27 should be the same as those obtained from the measured TOA profile to obtain $R_i$ and $r_{DOS}$. However, because these equations are non-linear equations, it is not easy to obtain the solution directly. Therefore, the difference between the calculated values and the measured values should be used in obtaining the mean and variance. In short, the $R_i$ and $r_{DOS}$ are obtained from $\mu_{ROS,j} - \hat{\mu}_{ROS,j}$ using a gradient algorithm, such as a Newton-Raphson method. This is expressed as an equation 28.

$$\begin{bmatrix} R_j \\ r_{ROS} \end{bmatrix}_k = \quad \text{Eq. 28}$$
$$\beta \begin{bmatrix} \frac{\partial \hat{\mu}_{ROS,j}}{\partial R_j} & \frac{\partial \hat{\mu}_{ROS,j}}{\partial r_{ROS}} \\ \frac{\partial \hat{\sigma}_{ROS,j}^2}{\partial R_j} & \frac{\partial \hat{\sigma}_{ROS,j}^2}{\partial r_{ROS}} \end{bmatrix} \begin{bmatrix} \mu_{ROS,j} - \hat{\mu}_{ROS,j} \\ \sigma_{ROS,j}^2 - \hat{\sigma}_{ROS,j}^2 \end{bmatrix} + \begin{bmatrix} R_j \\ r_{ROS} \end{bmatrix}_{k-1}$$

wherein β denotes a step size that controls the convergence of the algorithm.

The Newton-Raphson algorithm is operated until the output converges into the solution of the $R_i$ and $r_{DOS}$. When the $R_1$, $R_2$ and $R_3$ are obtained, the location of the MS can be detected by using such methods as LLOP and least square.

B) MVMA for the DOS Model

The PDF of the DOS model is determined to be a function of $l_j$, $R_j$ and $R_d$ from the $N(l_i)$ and $D(l_i)$ of the equation 17. Accordingly, the mean and variance of a measured TOA is a function of the $R_j$ and $R_d$. Closed form equations for the mean and variance are not obtained, when MVMA is used to obtain the $R_j$ and $R_d$. Therefore, they are obtained by dividing the $l_j$ into small sections to integrate it, as shown in equations 29 and 30 below.

$$\hat{\mu}_{DOS,j} = \int_{R_j}^{R_j+2R_d} l_j P_{DOS}(l_j) dl_j \approx \sum_{n=R_j}^{R_j+2R_d} n \cdot P_{DOS}(n) \cdot \Delta n \quad \text{Eq. 29}$$

$$\hat{\sigma}_{DOS,j}^2 = \int_{R_j}^{R_j+2R_d} l_j^2 P_{DOS}(l_j) dl_j - \hat{\mu}_{DOS,j}^2 \quad \text{Eq. 30}$$
$$\approx \sum_{n=R_j}^{R_j+2R_d} n^2 \cdot P_{DOS}(n) \cdot \Delta n - \hat{\mu}_{DOS,j}^2$$

Here, $\Delta n$ is a small section of the $l_j$, which is used for Riemann summation.

The $R_j$ and $R_d$ are obtained by making the equations 29 and 30 the same as the means and variance of the measured values. That is, the $R_j$ and $R_d$ can be obtained as shown in an equation 31 and 32 below by subtracting the equations 29 and 30 from the mean $\mu_{DOS,j}$ and variance $\sigma^2_{DOS,j}$ of the measured values.

$$\mu_{DOS,j} - \hat{\mu}_{DOS,j} = 0 \quad \text{Eq. 31}$$

$$\sigma_{DOS,j}^2 - \hat{\sigma}_{DOS,j}^2 = 0 \quad \text{Eq. 32}$$

However, since there is no closed-form expression on the equation 31 and 32, an error surface having the minimum value in the $R_j$ and $R_d$ is formed to obtain a solution. The error surface is defined as an equation 33.

$$\epsilon(R_j, R_d) = |\mu_{DOS,j} - \hat{\mu}_{DOS,j}| + |\sigma_{DOS,j} - \hat{\sigma}_{DOS,j}| \quad \text{Eq. 33}$$

In the equation 33, the minimum value of the error surface can be obtained, when each term is zero, i.e., $\mu_{DOS,j} = \hat{\mu}DOS,j$ and $\sigma_{DOS,j} = \hat{\sigma}_{DOS,j}$.

Here, the error surface is calculated by using a standard deviation instead of a variance. This is because the variance is larger than the mean so it may dominate the entire minimization process.

However, since the mean and variance should be evaluated numerically, the error surface should be calculated numerically as well. In this case, a Nedler-Mead algorithm, which is a simplex method, can be used to obtain the minimum value. After the $R_i$ is obtained using the algorithm that can obtain a minimum value, the obtained $R_i$ is applied to a general positioning algorithm, such as LLOP and least square algorithms, to locate the MS.

C) MVMA for the Gaussian Model When MVMA is applied to a Gaussian model, the PDF is given as the equation 19. A measured signal is integrated to obtain the mean and variance, which is shown in equations 34 and 35.

$$\hat{\mu}_{gauss,j} = \int_{R_j}^{2R_j} l_j P_{gauss}(l_j) dl_j \approx \sum_{n=R_j}^{2R_j} n \cdot P_{gauss}(n) \cdot \Delta n \quad \text{Eq. 34}$$

$$\hat{\sigma}_{gauss,j}^2 = \int_{R_j}^{2R_j} l_j^2 P_{gauss}(l_j) dl_j - \hat{\mu}_{gauss,j}^2 \quad \text{Eq. 35}$$
$$\approx \sum_{n=R_j}^{2R_j} n^2 \cdot P_{gauss}(n) \cdot \Delta n - \hat{\mu}_{gauss,j}^2$$

Here, $\Delta n$ denotes the step size of the Riemann summation, and the maximum limit of the integration may have a value larger than the cell radius, theoretically. However, the maximum limit is determined to be $2R_j$, here, in consideration of the logical and practical aspects. When the equations 34 and 35 are calculated by putting the equation 19 thereto, the results are as shown in equations 36 and 37.

$$\hat{\mu}_{gauss,j} \approx \sum_{n=R_j}^{2R_j} n \sum_{\theta=-\pi}^{\pi} P_{gauss}(n,\theta) \cdot \Delta\theta \cdot \Delta n \qquad \text{Eq. 36}$$

$$\hat{\sigma}^2_{gauss,j} \approx \sum_{n=R_j}^{2R_j} n^2 \sum_{\theta=-\pi}^{\pi} P_{gauss}(n,\theta) \cdot \Delta\theta \cdot \Delta n - \hat{\mu}^2_{gauss,j} \qquad \text{Eq. 37}$$

Just as the MVMA for DOS model, the MVMA for the Gaussian model also obtains the $R_j$ and $\sigma_g$ by matching the equations 36 and 37 with the mean and variance of the measured signals. Since there is no closed form expression in this case, either, the solution is calculated numerically by forming an error surface, just as in the MVMA for a DOS model. The Nedler-Mead algorithm can be used, and after the $R_j$ and $\sigma_g$ are obtained, the location of the MS is determined by using such an algorithm as the LLOP or least square.

The method of the present invention, described above, can be stored in a computer-readable recording medium, such as CD-ROM, RAM, ROM, floppy disks, hard disks, optical-magnetic disks, and the like.

The NLOS error frequently occurs in a complex propagation environment, such as dense urban or urban area, and works as the biggest factor for generating a location error. The NLOS error correction method of the present invention enhances the location accuracy of a mobile communication system by correcting an NLOS error, and thus provides a high-quality location service with a precise resolution, when a wireless positioning system is embodied on a mobile communication network, such as cellular, PCS and IMT-2000 system.

The method of the present invention checks out the location of the MS in the above environment and provides diverse services by correcting the location error caused by NLOS propagation included in a received signal. That is, a user can enjoy a high-quality location service by receiving the location information only within the radius which user wants, such as traveler's information, vehicle tracking, location service, and location-based advertisements, because the location of the user's MS is detected precisely.

In addition, the method of the present invention improves the accuracy of a location service (LCS) and a location-based service (LBS) to provide diverse services by correcting the NLOS error in the mobile communication network. Besides, as the positioning performance of the MS becomes more accurate, the positioning system or network can transmit and receive only necessary information without wasteful consumption of radio resources and the wireless positioning system is not set up excessively.

While the present invention has been described with respect to certain preferred embodiments, it will be apparent to those skilled in the art that various changes and modifications may be made without departing from the scope of the invention as defined in the following claims.

What is claimed is:

1. A method for correcting a non-line-of-sight (NLOS) error in a wireless positioning system, comprising the steps of:

a) determining whether the number of received signals from a mobile station (MS) is larger than a predetermined number;

b) if the number of the received signals from the mobile station is equal to or less than the predetermined number, determining a location of the MS based on weighting factors obtained through an optimization process with respect to each of the received signals which are assumed to include an error caused by NLOS propagation; and c) if the number of the received signals from the mobile station is larger than the predetermined number, determining a location of the MS based on second moments of the received signals, wherein the step b) includes the steps of:

b1) making constraints and obtaining a weighting factors through an optimization process with respect to each received signal which is assumed to include an error caused by NLOS propagation; and b2) based on the weighting factors, correcting the NLOS error and determining the location of the MS.

2. The method as recited in claim 1, wherein a cost function of the location of the MS is expressed by an equation as:

$$f(x,y)=(x-U_x)^2+(y-U_y)^2+(x-V_x)^2+(y-V_y)^2+(x-W_x)^2+(y-W_y)^2$$

where U, V and W denote coordinates of points in which three circles are overlapped, x and y denote coordinates of the location of the MS.

3. The method as recited in claim 1, wherein the NLOS error is corrected by obtaining a NLOS distance using a linear line of position (LLOP) algorithm.

4. The method as recited in claim 3, wherein the location of the MS is expressed by an equation as:

Minimize $F(v)$ Subject to $g(v)=0$, $LB \leq v \leq UB$ wherein the LB and UB are as follows:

$$v = \begin{bmatrix} \alpha \\ \beta \\ \gamma \end{bmatrix}, LB = \begin{bmatrix} \alpha_{min} \\ \beta_{min} \\ \gamma_{min} \end{bmatrix}, UB = \begin{bmatrix} 1 \\ 1 \\ 1 \end{bmatrix}.$$

5. The method as recited in claim 1, wherein the step c) includes the steps of:

c1) obtaining second moments of a signal which is assumed to include an error caused by NLOS propagation, and comparing the second moments with theoretical values of scattering models;

c2) based on the comparison result, obtaining LOS distance and parameters of the scattering models; and c3) based on the LOS distance and the parameters, correcting the NLOS error and determining the location of the MS.

6. The method as recited in claim 5, wherein the NLOS error is corrected through one of a ring of scatterers (ROS) model, disk of scatterers (DOS) model and Gaussian distributed scattering model.

7. The method as recited in claim 5, wherein the NLOS error is corrected by matching the mean and variance obtained from the ROS/DOS/Gaussian scattering model using the second moments with the mean and variance obtained from the received signal.

8. The method as recited in claim 7, wherein in case of the ROS scattering model, the mean and the variance are expressed by equations as:

$$\hat{\mu}_{ROS,j} = R_j + 2r_{ROS} - \left(r_{ROS} + \frac{1}{\pi}\frac{317 r_{ROS}^2}{420 R_j} + \frac{1}{\pi}\frac{r_{ROS}^4}{35 R_j^3} + \frac{1}{\pi}\frac{2 r_{ROS}^6}{1155 r_j^5}\right)$$

$$\hat{\sigma}_{ROS,j}^2 = R_j^2 + 4R_j r_{ROS} + 4r_{ROS}^2 - \frac{2}{\pi}$$
$$\left(\pi R_j r_{ROS} + \pi r_{ROS}^2 + \frac{317 r_{ROS}^3}{420 R_j} + \frac{r_{ROS}^5}{35 R_j^3} + \frac{2 r_{ROS}^7}{1155 R_j} - \hat{\mu}_{ROS,j}^2\right)$$

where $\hat{\mu}_{ROS,j}$ and $\hat{\sigma}_{ROS,j}^2$ are a mean and a variance of the ROS scattering model, and $R_j$ is a distance between the BS and the MS.

9. The method as recited in claim 7, wherein in case of the DOS scattering model, the mean and the variance are expressed by equations as:

$$\hat{\mu}_{DOS,j} = \int_{R_j}^{R_j+2R_d} l_j P_{DOS}(l_j)\, dl_j \approx \sum_{n=R_j}^{R_j+2R_d} n \cdot P_{DOS}(n) \cdot \Delta n$$

$$\hat{\sigma}_{DOS,j}^2 = \int_{R_j}^{R_j+2R_d} l_j^2 P_{DOS}(l_j)\, dl_j - \hat{\mu}_{DOS,j}^2$$
$$\approx \sum_{n=R_j}^{R_j+2R_d} n^2 \cdot P_{DOS}(n) \cdot \Delta n - \hat{\mu}_{DOS,j}^2$$

where $\hat{\mu}_{DOS,j}$ and $\hat{\sigma}_{DOS,j}^2$ are a mean and a variance of the DOS scattering model, and $R_j$ is a distance between the BS and the MS.

10. The method as recited in claim 7, wherein in case of the Gaussian distributed scattering model, the mean and the variance are expressed by equations as:

$$\hat{\mu}_{gauss,j} \approx \sum_{n=R_j}^{2R_j} n \sum_{\theta=-\pi}^{\pi} P_{gauss}(n,\theta) \cdot \Delta\theta \cdot \Delta n$$

$$\hat{\sigma}_{gauss,j}^2 \approx \sum_{n=R_j}^{2R_j} n^2 \sum_{\theta=-\pi}^{\pi} P_{gauss}(n,\theta) \cdot \Delta\theta \cdot \Delta n - \hat{\mu}_{gauss,j}^2$$

where $\hat{\mu}_{gaussian,j}$ and $\hat{\sigma}_{gaussian,j}$ are a mean and a variance of the Gaussian scattering model, and $R_j$ is a distance between the BS and the MS.

11. The method as recited in claim 7, wherein the NLOS error is corrected by using a gradient algorithm, such as the Newton-Raphson method, to obtain a solution, in case of the ROS model.

12. The method as recited in claim 7, wherein the NLOS error is corrected by forming an error domain and matching the means and variances numerically, in case where a closed form of a solution cannot be obtained.

13. The method as recited in claim 12, wherein the size of the error domain is balanced by using a determinant of a standard deviation, instead of the variance.

14. The method as recited in claim 13, wherein the minimum value of the error domain is obtained by using a Nedler-Mead algorithm.

15. The method as recited in claim 5, wherein the NLOS error is corrected by obtaining a LOS distance using a LLOP algorithm.

16. A computer-readable recording medium for recording a program for executing a method for correcting a non-line-of-sight (NLOS) error in a wireless positioning system, comprising the steps of:

a) determining whether the number of received signals from a mobile station (MS) is larger than a predetermined number;

b) if the number of the received signals from the mobile station is equal to or less than the predetermined number, determining a location of the MS based on a weighting factors obtained through an optimization process with respect to each of the received signals which is assumed to include an error caused by NLOS propagation; and c) if the number of the received signals from the mobile station is larger than the predetermined number, determining a location of the MS based on second moments of the received signals, wherein the step b) includes the steps of:

b1) making constraints and obtaining a weighting factors through an optimization process with respect to each received signal which is assumed to include an error caused by NLOS propagation; and b2) based on the weighting factors, correcting the NLOS error and determining the location of the MS.

17. The computer-readable recording medium as recited in claim 16, wherein the step c) includes the steps of:

c1) obtaining second moments of a signal which is assumed to include an error caused by NLOS propagation, and comparing the second moments with theoretical values of scattering models;

c2) based on the comparison result, obtaining LOS distance and parameters of the scattering models; and c3) based on the LOS distance and the parameters, correcting the NLOS error and determining the location of the MS.

* * * * *